United States Patent [19]

Dague

[11] 4,267,001
[45] May 12, 1981

[54] METHOD FOR MAKING PICTURE RECORDS

[75] Inventor: Harold F. Dague, Costa Mesa, Calif.

[73] Assignee: Pic Disc, Inc., Los Angeles, Calif.

[21] Appl. No.: 28,579

[22] Filed: Apr. 9, 1979

[51] Int. Cl.³ .......................... B29C 3/00; B29D 17/00
[52] U.S. Cl. .................................. 156/245; 264/106; 264/107; 425/810
[58] Field of Search ...................... 156/242, 245, 219; 264/106, 107; 425/810; 274/3, 41, 46

[56] References Cited

U.S. PATENT DOCUMENTS

| | | | |
|---|---|---|---|
| 3,578,539 | 5/1971 | Lash | 264/107 |
| 3,687,769 | 8/1972 | Dague | 156/219 |
| 4,064,674 | 12/1977 | Palmer | 425/810 |

FOREIGN PATENT DOCUMENTS

| | | | |
|---|---|---|---|
| 231134 | 11/1960 | Australia | 264/106 |
| 282180 | 1/1965 | Australia | 264/106 |
| 368621 | 3/1932 | United Kingdom | 264/106 |
| 828775 | 2/1960 | United Kingdom | 264/107 |
| 1147638 | 4/1969 | United Kingdom | 264/107 |

*Primary Examiner*—Caleb Weston
*Attorney, Agent, or Firm*—Blakely, Sokoloff, Taylor & Zafman

[57] ABSTRACT

Methods and apparatus for making picture records whereby records of a high quality may be mass produced at a faster rate. In accordance with the method, a thin layer of plastic is first laminated over sheets containing the pictures desired. The laminated pictures are then cut from the sheets, preferably to have a diameter slightly smaller than the diameter of the desired finished record. Thereafter, the laminated pictures are placed in the record press two at a time, each with the picutre and plastic lamination thereover facing the adjacent die half. A biscuit, or alternatively a sheet of appropriate size is placed therebetween and the die is closed to press the record, with trimming, etc. proceeding in accordance with prior art techniques. Apparatus for practicing the method on an automatic record press is disclosed, though alternatively the method may be practiced to advantage on manual presses also.

27 Claims, 16 Drawing Figures

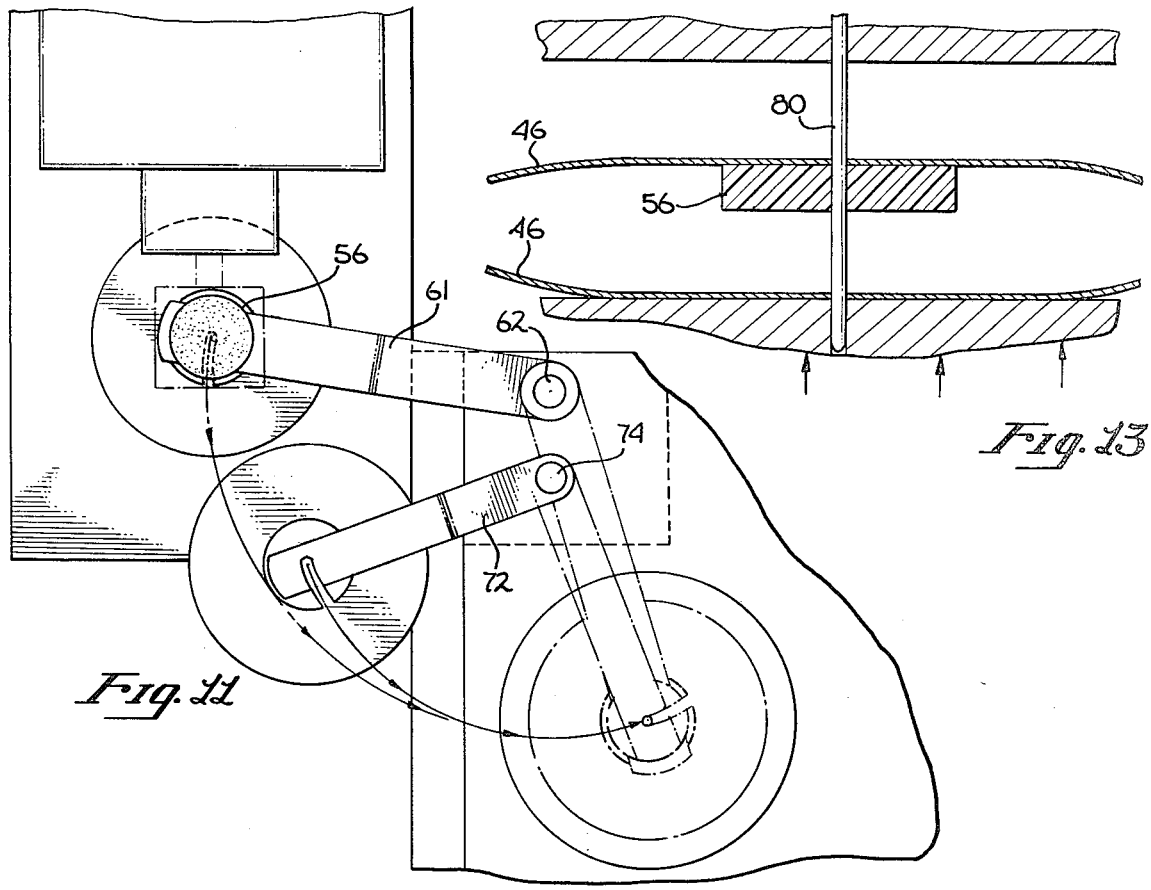
Fig. 11
Fig. 13
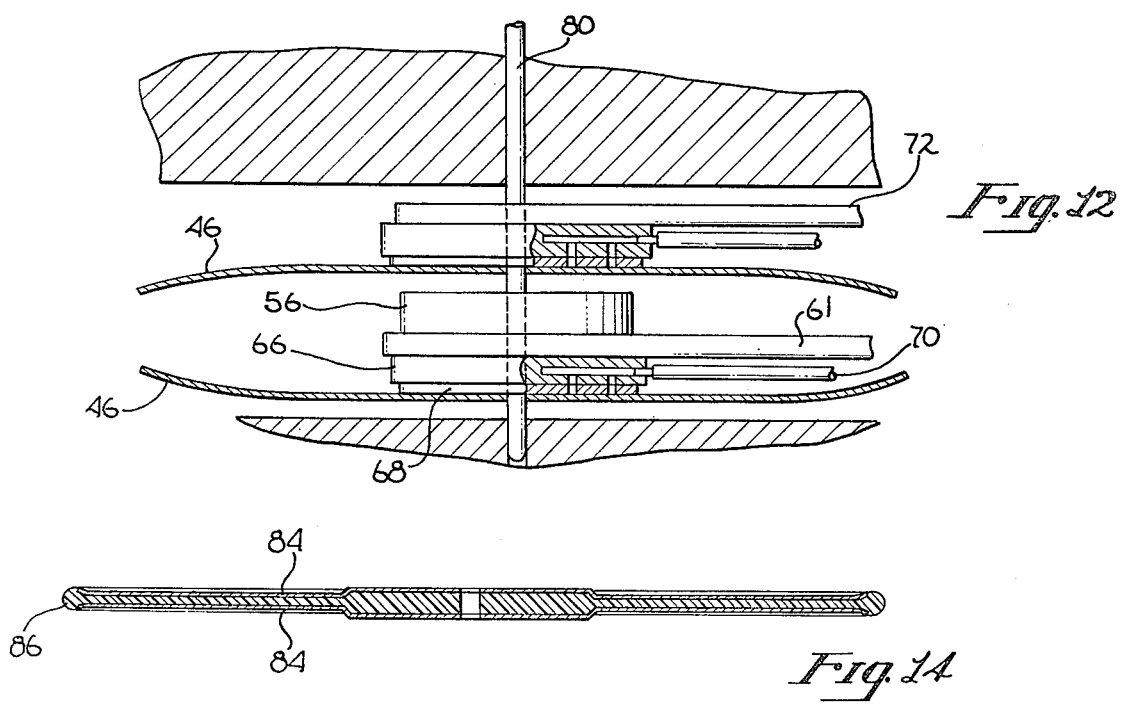
Fig. 12
Fig. 14

METHOD FOR MAKING PICTURE RECORDS

BACKGROUND OF THE INVENTION

1. Field of the Invention

The present invention relates to the field of record manufacturing, and more particularly to the field of picture record manufacturing.

2. Prior Art

Very recently a substantial market for picture records has developed, provided the picture records are of high quality, both in their sound reproduction capabilities and in their appearance. Such records are characterized by clear plastic surfaces into which the sound grooves are pressed, and below which are pictures of the artists, etc. having a size at least approximating the diameter of the record and visible through the clear plastic. While particular picture records may have other visual characteristics, these frequently depend upon the specific method of manufacture which is used.

Two prior art methods of making picture records and the structure of the records so made are disclosed in U.S. Pat. Nos. 3,584,094 and 3,687,769. Those two patents also contain a good description of prior problems in the manufacture of picture records and further provide, through the patents cited during the prosecution of those two applications and in the descriptions of the prior art therein, a good listing of the then relevant prior patents. (In addition to those patents, other prior patents of background interest include U.S. Pat. No. 1,477,117 issued to Gleason; U.S. Pat. No. 1,931,287 issued to Fisher; U.S. Pat. No. 2,528,611 issued to Saffady; U.S. Pat. No. 3,052,586 issued to Brown; U.S. Pat. No. 3,102,730 issued to Bardowicks et al.; U.S. Pat. No. 3,132,866 issued to Nitti et al.; U.S. Pat. No. 3,247,298 issued to Utiger; U.S. Pat. No. 3,578,539 issued to Iash; U.S. Pat. No. 3,689,078 issued to Ban; U.S. Pat. No. 3,787,274 issued to Genma; and U.S. Pat. No. 3,787,275 issued to Genma.)

U.S. Pat. No. 3,687,769 hereinbefore referred to discloses a laminated picture type phonograph record and method of making the same which results in a record comprised generally of five layers, specifically, a center core, an outward facing picture sheet on each side of the center core, and finally facing layers of thin, clear plastic into which the sound grooves are pressed. On pressing, the entire assembly is bonded into a single structure with the pictures preferably extending to a diameter slightly exceeding the diameter of the sound grooves, though not extending to the outer edge of the record so that the periphery of the record is solid plastic. In that regard, by making the center core black and and of a diameter at least equal to the flash land diameter on the record press (the clear plastic sheets should preferably be equal to or greater than the flashland diameter also) the outer edge of the record has a black appearance, much like the edge of conventional records. The center core as disclosed in this patent is a preform, though a biscuit (boomershot) may also be used with very careful and proper control of the pressing operation.

Records made in accordance with the foregoing patent can be of particularly high quality. Since each surface sheet is a thin, clear plastic sheet, the two pictures are very close to the adjacent record surfaces so that good picture clarity is achieved even though viewed through the record grooves. In addition, the use of the black center core resulting in the black edges for the record provides a psychological compatability or association of the picture records with conventional records. Further, the pictures may be on relatively thin sheets in comparison to certain prior art which utilizes a relatively heavy board printed on both sides so as to keep material costs down, the cost further being reduced by the fact that the center core material does not have to be a high grade material. Pressing records using this technique, however, is not particularly inexpensive, as four or five separate parts must be manually loaded into the record press for each record. Further, because of the number of parts which must be handled and alignment requirements to prevent warpage, the system does not readily lend itself to automation.

BRIEF SUMMARY OF THE INVENTION

Methods and Apparatus for Making Picture Records whereby records of a high quality may be mass produced at a faster rate. In accordance with the method, a thin layer of plastic is first laminated over sheets containing the pictures desired. The laminated pictures are then cut from the sheets, preferably to have a diameter slightly smaller than the diameter of the desired finished record. Thereafter, the laminated pictures are placed in the record press two at a time, each with the picture and plastic lamination thereover facing the adjacent die half. A biscuit, or alternatively a sheet of appropriate size is placed therebetween and the die is closed to press the record, with trimming, etc. proceeding in accordance with prior art techniques. Apparatus for practicing the method on an automatic record press is disclosed, though alternatively the method may be practiced to advantage on manual presses also.

BRIEF DESCRIPTION OF THE DRAWINGS

FIG. 11 is a top view of a portion of the laminated picture loading mechanism of the automated press of FIGS. 8 and 9.

FIG. 12 is a partial cross section taken through the press illustrating the loading of the various picture record components therein.

FIG. 13 is a view corresponding to FIG. 12 after withdrawal of the loading arms.

FIG. 14 is a schematic illustration of the cross section of a finished picture record.

DETAILED DESCRIPTION OF THE INVENTION

In accordance with one method of the present invention sheets of paper are printed with one or more pictures to be presented on the picture records. Thereafter, a sheet of clear plastic of appropriate material and thickness is laminated over the face of the printed sheets so as to cover and be bonded to the picture side of the printed sheets. The pictures with the plastic laminated thereover are then cut from the sheets and used much like labels during the pressing operation to form the finished picture records. In that regard, the center core formed in the pressing operation may either start as a preform (or sheet) or be the conventional boomershot as used in most modern record presses. The use of the prelaminated pictures in accordance with the present invention has an advantage when pressing records on manual presses in that fewer component parts must be loaded into the press by the operator, though the method is particularly advantageous when used with modified automatic presses, a representative type of which is disclosed herein, as the prelaminated pictures may be automatically loaded into the press by using modified forms of label loading devices. Details of specific methods following this general method and representative apparatus for automatic pressing of records using the invented methods are described in detail herein with reference to the accompanying drawings.

Figure 1:
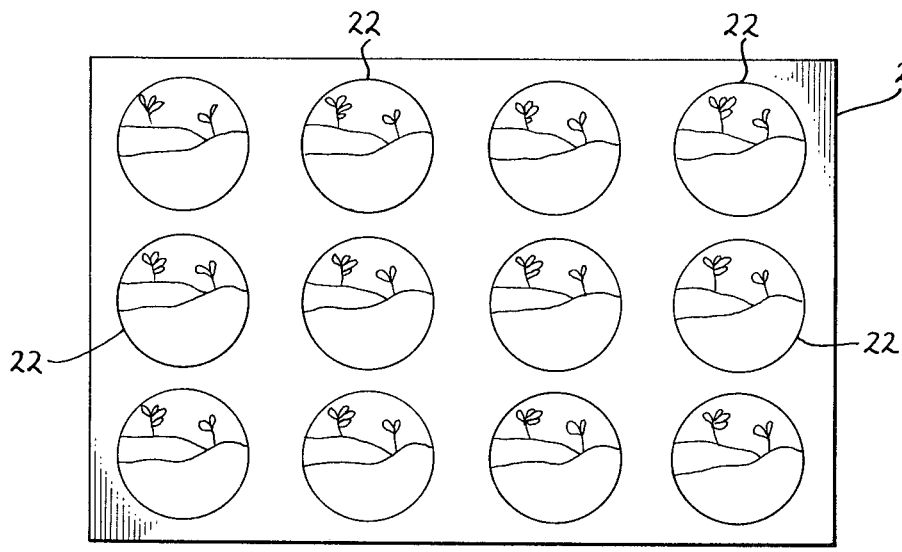
FIG. 1 is a face view of a printed sheet having twelve printed pictures thereon.

First referring to FIG. 1, the result of the first step of the method may be seen. In particular, a sheet 20 is printed with a repetitive pattern of individual pictures 22, twelve such pictures being shown in the figure. In the preferred method of practicing the invention, the sheets are 80 or 90 pound paper coated or polished on both sides.

Figure 2:
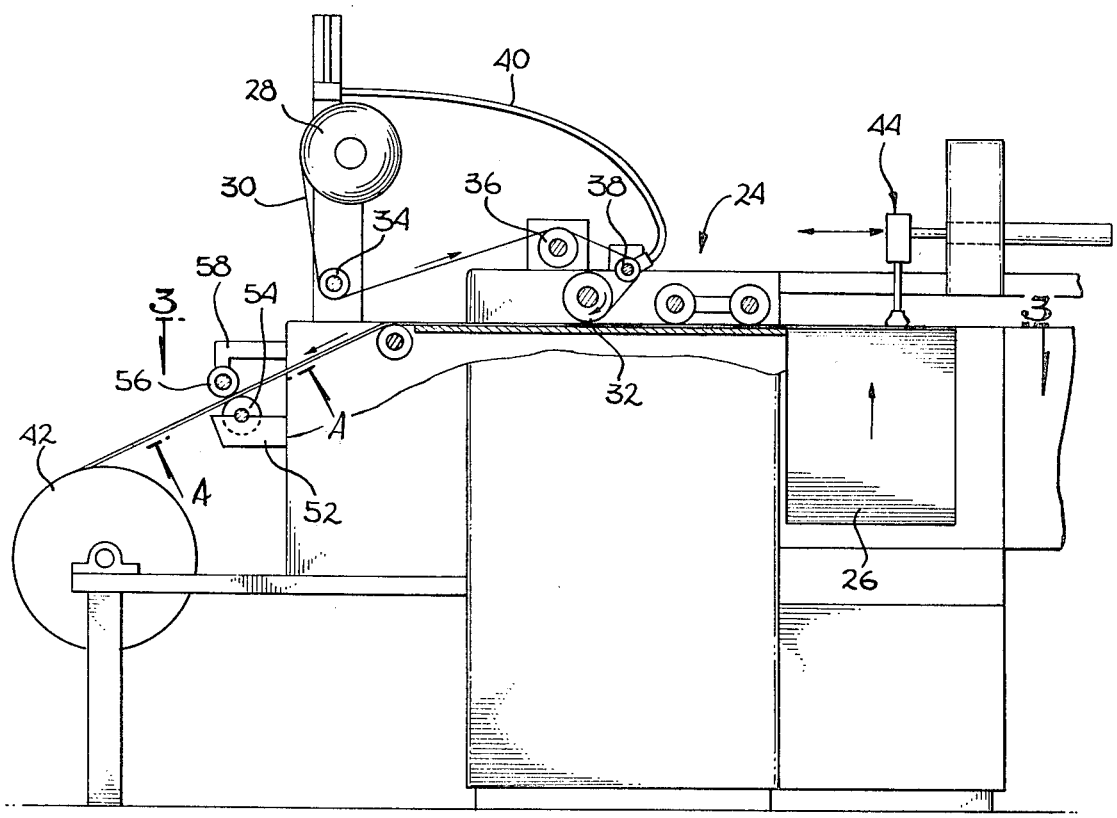
FIGS. 2 through 4 are illustrations of a laminating machine used for laminating a sheet of clear plastic film to the picture side of the printed sheet of FIG. 1.
Figure 3:
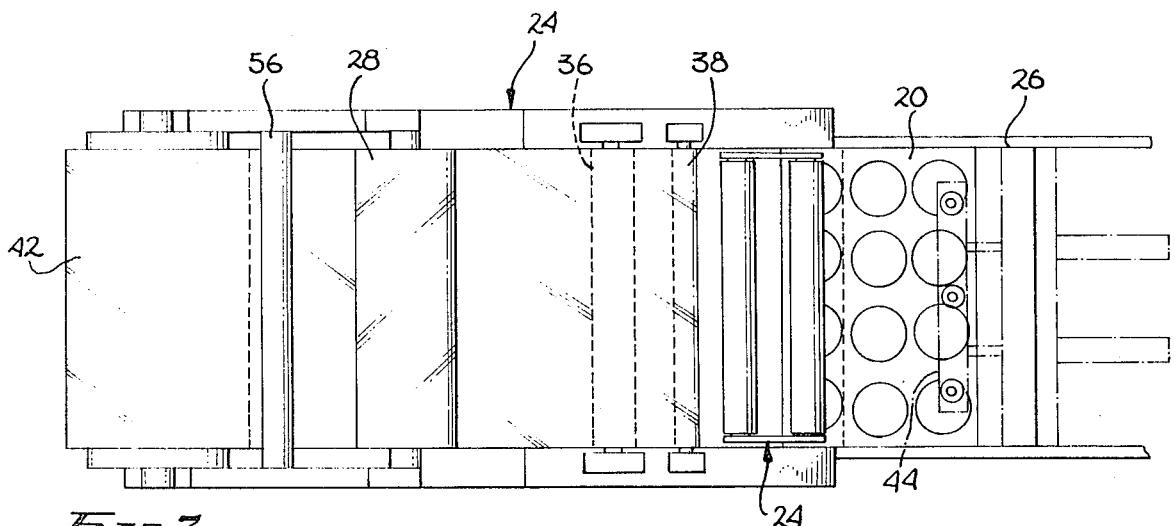
Figure 4:
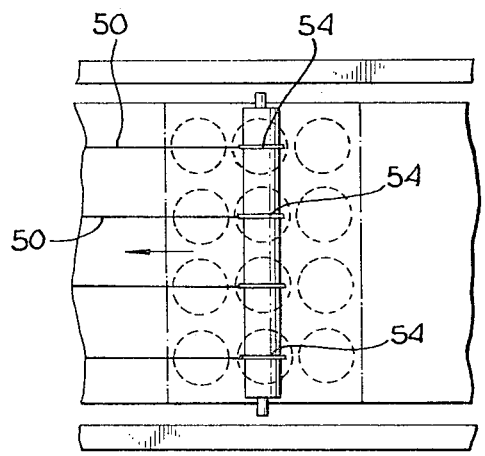

After the sheets are printed as shown in FIG. 1, they are passed through a laminating or bonding machine shown in FIGS. 2, 3 and 4. The laminating machine, generally indicated by the numeral 24, receives a stack 26 of printed sheets 20 and a roll 28 of clear plastic 30. The sheets 20 are sequentially released onto a transport system which conveys the sheets 20 serially under a roller 32 (see FIG. 2). At the same time, a clear plastic sheet 30 is guided past rollers 34, 36 and 38 to finally pass under roller 32 so as to be pressed flat against the upper or printed surface of each of the sheets. Also at the same time, an adhesive, typically a water-base vinyl adhesive, is provided through a supply tube 40 to be applied to the surface of the clear plastic film so that the clear plastic is directly bonded and laminated to the printed face of each of the sheets 20 under roller 32. Generally speaking, the paper or board is not significantly wetted by the adhesive, so that no substantial drying is required before the laminated materials are rolled up on roll 42. In that regard, it should be noted that the feed mechanism of the machine generally loads the sheets from stack 22 so that the leading edge of one sheet being fed extends under and slightly forward of the trailing edge of the previous sheet, so that the sheets feed smoothly under roller 32 and adhesive does not pass to the opposite sides of the sheets between sheets, with the clear plastic sheet giving the laminated structure sufficient continuity between paper sheets 20 so as to allow the rolling of the laminated material onto the rolls 42. Excessive moisture should be avoided, and/or a drying step included so that the laminated pictures as ultimately used have a low moisture content.

Equipment of this kind is generally commercially available and accordingly further details on the operation thereof will not be given herein. By way of example, high-speed laminating equipment of the general type shown in these figures is sold by General Binding Corporation, North Brook, Ill., under their trademark ROTOBOND. In the preferred embodiment, the clear plastic film 30 is a high-grade rigid vinyl film, having a thickness of approximately 0.004 inches. In that regard, a film thickness of 0.005 inches is also highly suitable. In fact, thickness in the range of approximately 0.003 to 0.010 inches are appropriate, though thicknesses beyond these limits are not preferred. In particular, if a vinyl film of less than the lower thickness is used, a picture record of reduced quality will result, since on pressing the record grooves into the clear vinyl film the grain of the paper thereunder tends to "print through" so as to detract from the quality of the sound recording obtained. On the other hand, it is desirable to have the surface of the picture relatively close to the surface of the record, as the sound grooves pressed into the clear plastic make the surface thereof appear slightly frosted which, if significantly displaced from the surface of the underlying picture, will cause the picture to appear somewhat out of focus. Further, since the clear plastic film 30 must be of a high grade plastic to assure high quality sound reproduction, whereas the center core of the record (yet to be described) may be of a low grade plastic, excessive thickness in the clear plastic sheets will also unnecessarily add to the cost of the finished record.

Figure 5:
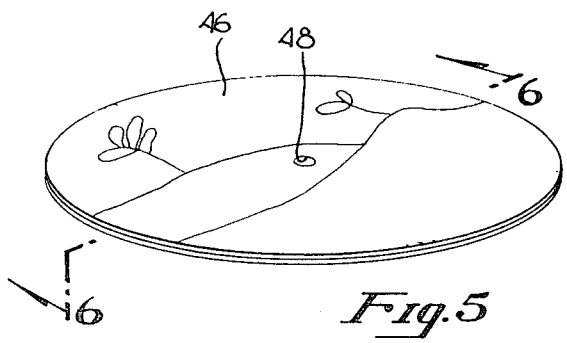
FIG. 5 is a perspective view of a laminated picture as die cut from the laminated sheets.
Figure 6:
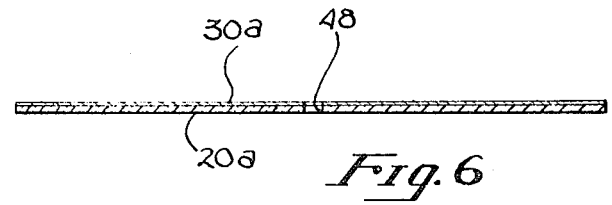
FIG. 6 is a cross section of the laminated picture of FIG. 5.

After the laminating step hereinbefore described, the individual pictures are die cut from each of the sheets 20 on the roll 42, preferably utilizing automated equipment, so that the circular laminated pictures after die cutting all have the same orientation. The outer diameter of the laminated picture disc 46 of FIG. 5 is preferably slightly smaller in diameter than the finished picture record, though again preferably larger in diameter than the largest sound grooves thereon. Also die punched at this time is the central hole 48, preferably to a diameter providing a slip fit over the pin in the record press. A cross section of the laminated picture is shown in FIG. 6, with the paper substrate 20a having the picture printed on the top surface thereof having a layer of clear plastic film 30a laminated or bonded thereto.

In the case of manual presses, the laminated pictures are placed on each platen of the record press, with each picture facing that platen. A boomershot is then placed in the press and the press closed to form the record and press the grooves in each layer of clear plastic. (Alternatively a preform having a diameter approximately the same as the finished record or even a sheet having a larger periphery may be used in place of the boomershot, though in any event the rate of closing of the record press should be limited in conjunction with the temperatures used so that radial flow of the core material does not explode the pictures.) When so pressed, the edge of the record will be defined by the center core material whereas the outer diameter or periphery of the pictures will preferably exceed the diameter of the sound grooves so that when the record is being played the needle will not follow along the edge of the picture so as to be susceptible to undesired noise.

Since the laminated pictures are placed in the manual press with the pictures facing the platens, the operator cannot see the pictures to be sure they are aligned if alignment of the pictures is desired. In such event, it is desirable to have a visually perceivable reference mark on the back of the printed picture so that this reference mark may be aligned with a corresponding reference mark on the record press to assure that the two pictures are aligned. Various techniques have been used to achieve such a visually perceivable reference indication, including the printing of a reference line on the back of the pictures. Such a reference line (and the prelines themselves) is preferably aligned with the length of the original roll of paper or orthogonal thereto so that the alignment of the reference marks on the two pictures forming a record also aligns the pictures. Printing the reference mark on the back of the printed pictures works well, though has the disadvantage that printing costs are increased by the fact that the pictures must be printed on two sides, not just one. Another technique which has been used is to cut a small v-notch at a selected point on the periphery of the pictures during the die cutting operation, which v-notch of course is perceivable from either side of the laminated picture. Such a v-notch, of course, is visible when viewing the finished record, though in many cases is not objectionable. However, in order to have a v-notch which is readily perceivable by an operator without undue close inspection, a v-notch of sufficient size must be used resulting in the notch extending into grooved area of the record, with the resulting possibility of unwanted noise when the needle crosses that region during the use of the record. Accordingly, this technique is also not preferred.

Figures 7A, 7B:
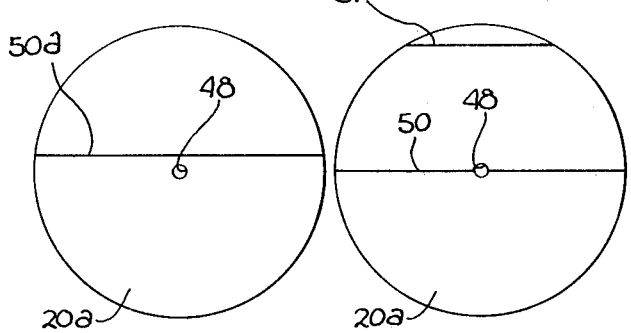
FIGS. 7, 7A and 7B are views of the back surface of the laminated pictures illustrating exemplary forms of reference indicia thereon.
Figure 7:
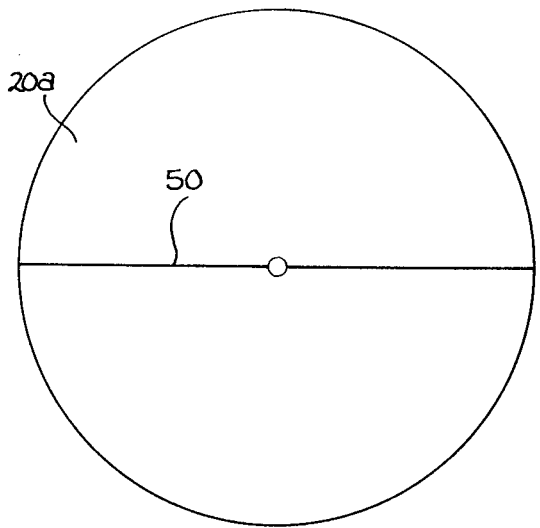

The preferred technique is to draw or otherwise provide a line 50 (see FIG. 7) diametrally across the back of the picture aligned with (or conversely always transverse with) the pictures. This may be accomplished during the laminating process by a very simple addition to the laminating machine. Thus as shown in FIG. 2, an ink reservoir 52 is provided adjacent the output of the laminating machine, with a plurality of rollers 54 (see also FIG. 4) supported for rotation thereabove for passing through the reservoir and marking the backs of the laminated printed sheets just before being rolled up on roll 42. The rollers 54, of course, are aligned with the center of each row of pictures on the sheets 20 so as to provide the longitudinal markings 50 on the back of the sheets as shown in FIGS. 4 and 7. An upper roller 56 supported on an arm 58 may be used to assure an appropriate contact between roller 52 and the back of the sheets, if desired. The resulting line on the back of each laminated picture is readily visible to a machine operater so as to allow the quick and easy alignment of the line with a reference mark on the press and thus the alignment of one picture with the other laminated picture in the resulting picture record. Since the line 50 (FIG. 7) extends across the entire diameter of the laminated picture, there is no 0° and 180° reference visible from the back of the laminated picture. If such a reference is desired, this may be effectively achieved by offsetting the line 50 from a diametral line, such as the line 50a in FIG. 7a or by adding a second reference line 51 at one side of the laminated picture as shown in FIG. 7b.

One of the advantages of using the laminated pictures hereinbefore described is that the pictures and outer sheet of clear plastic used in U.S. Pat. No. 3,687,769 are now single items which may be considered as simply large labels. Accordingly, the laminated pictures may be used for the automated pressing of picture records by merely modifying prior art automated record presses so as to be capable of handling "larger labels". In that regard, an exemplary press is illustrated in FIGS. 8 through 13, modified of course to accomodate the laminated pictures. The particular record press is basically that of U.S. Pat. No. 4,064,674, using a well-known cake molding (boomershot) and label loading means, some details of which are also given in U.S. Pat. No. 3,702,749. This apparatus has been modified primarily in the positioning of the label supplies so as to provide greater separation therebetween to accomodate the considerably larger laminated pictures.

Figure 8:
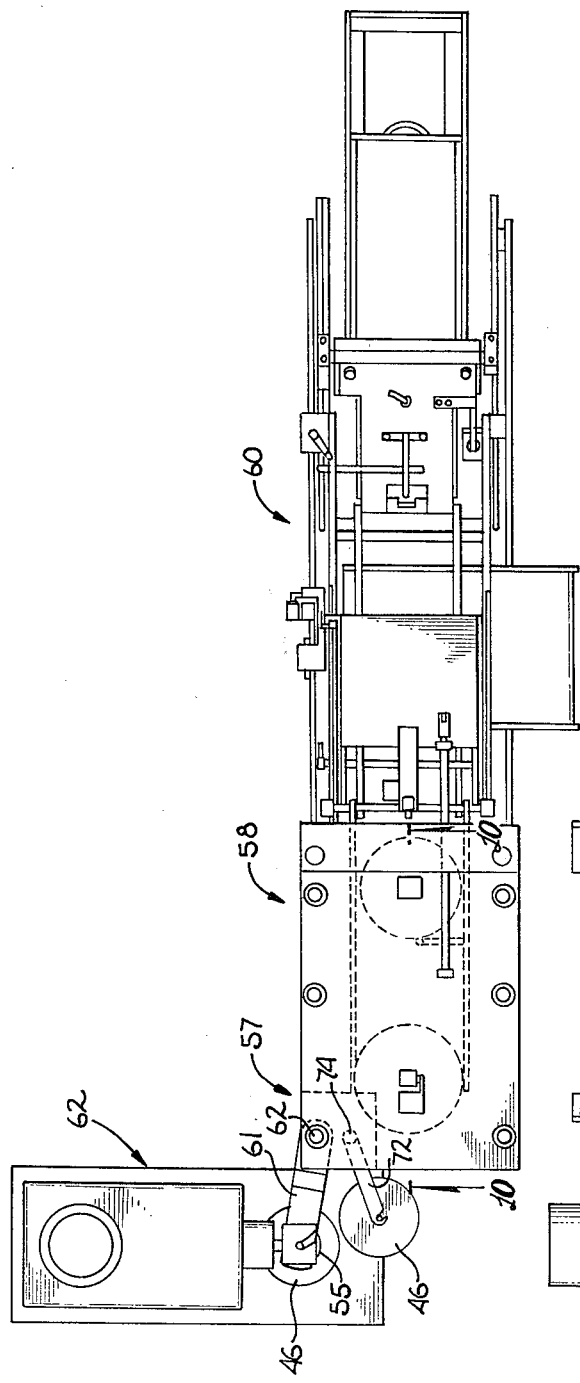
FIG. 8 is a top view of a prior art automated record press altered so as to automatically press picture records in accordance with the present invention.
Figure 9:
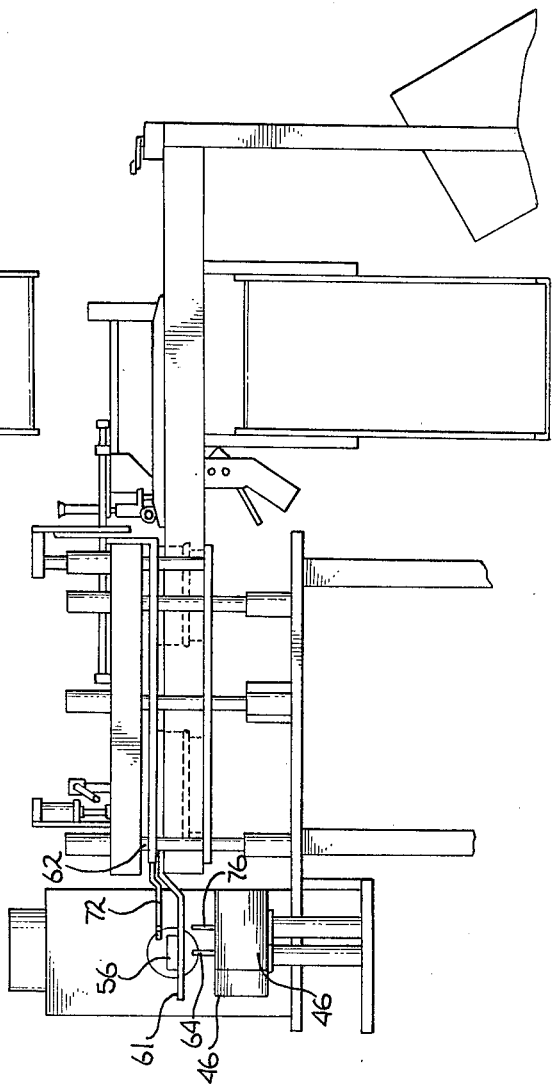
FIG. 9 is a partial side view of the record press of FIG. 8.
Figure 10:
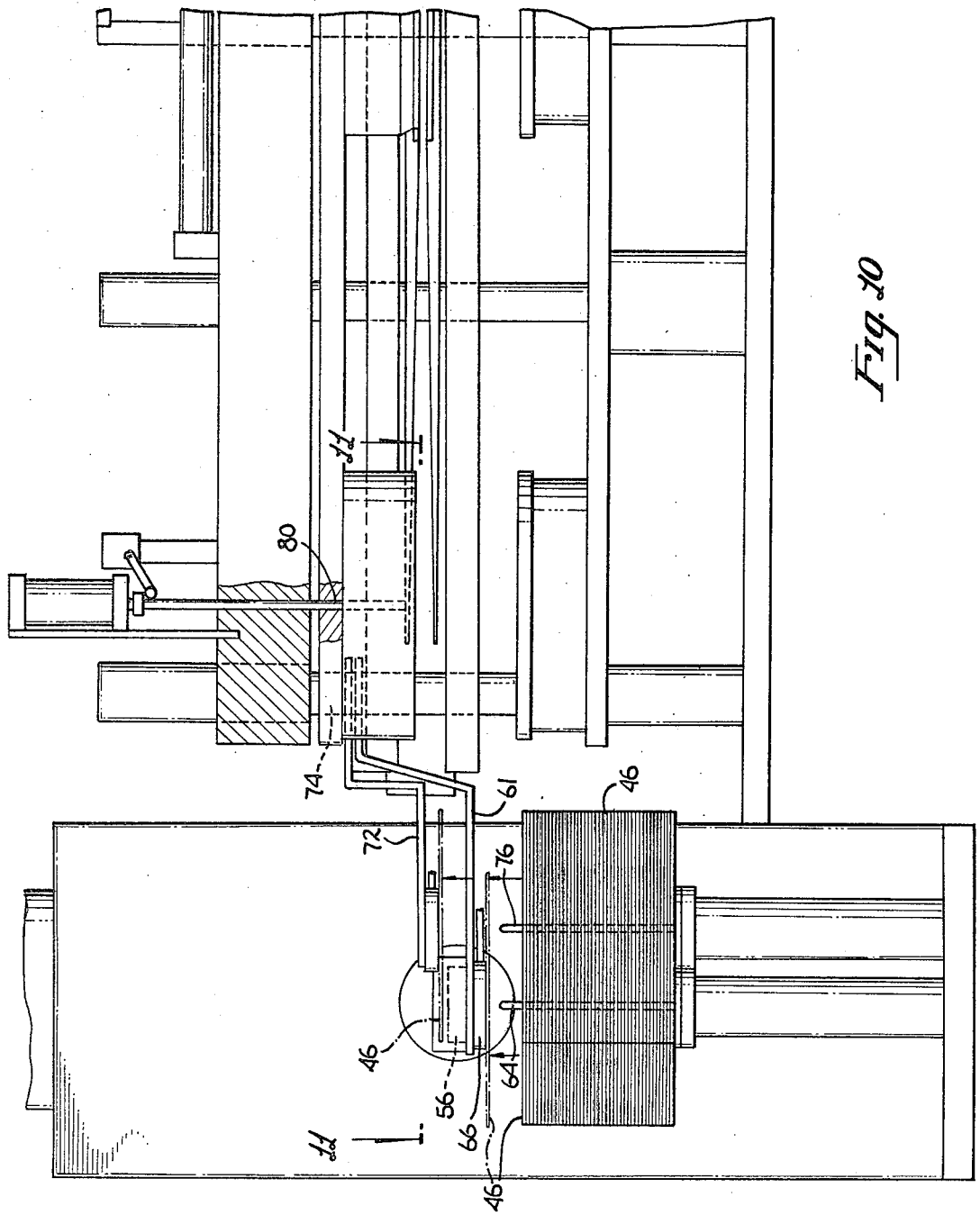
FIG. 10 is a view taken on an expanded scale of the picture loading apparatus of the record press of FIG. 9.

FIG. 8 presents a top view and FIG. 9 a side view of the record press. The press is comprised of a pressing station generally indicated by the numeral 57, a trimming station generally indicated by the numeral 58, and a packaging and stacking station generally indicated by the numeral 60. Since a picture record, once pressed, may be physically exactly like any other record, the trimming and packaging and stacking stations may be unmodified over those of the prior art, and accordingly the details of such stations on the exemplary automated record press will not be given herein. In that regard, the pressing station itself may also be identical to that used in the prior art, as the only changes in the pressing operation which may be appropriate relate to the pressing temperatures and rate of press closure, so that while the press cycle may be varied from that used for conventional record pressing, the apparatus need not be changed. The problem, however, is to appropriately load the laminated pictures into the press.

The record press illustrated in the figures has an extruder generally indicated by the numeral 62 for extruding a predetermined amount of plastic into a mold 55 (see FIG. 8). With the mold withdrawn, this provides a cake (also sometimes referred to as biscuit or boomershot) 56 disposed on the top surface of an arm 61, supported on shaft 62 (see also FIG. 11) for oscillation about the center of the shaft between the cake molding position shown in FIG. 11 and the press loading position shown in phantom in that figure. Located immediately therebelow is a first post or spindle 64 on which a supply of laminated pictures 46 are provided. The lower surface of arm 61 is provided with a vacuum gripping system, probably best illustrated in FIG. 12. In particular, the arm 61 has a preforated plate 66 fastened to the lower surface thereof with a corresponding preforated rubber face member 68 therebelow. These members are coupled to a vacuum line 70, which may be controlled to grip and release individual laminated pictures for the automatic loading thereof into the press. In particular, the control system for arm 61, after the biscuit is molded and deposited thereon, lowers the arm and turns on the vacuum so that an individual laminated picture is grasped thereby for movement first upward off of spindle 64, and then for rotation into the record press as illustrated in FIGS. 11 and 12. (This general operation corresponds with the motion of the corresponding label loading arm in the prior art automatic record press.) It should be noted that it is not necessary for the vacuum gripper on the lower surface of arm 61 to be as large as the laminated picture itself, as the laminated picture, though having some slight tendency to curl, is relatively self-supporting so as to not require support across its entire area. Also obviously, the laminated pictures in the supply stack for pick up by arm 61 should be stacked in a picture-down orientation so that the picture faces the lower half of the mold into which it will be loaded.

A second arm 72 supported for oscillation on axis 74 operates in conjunction with a second supply of labels on pin or spindle 76. In comparison to the prior art, the two supply spindles have a considerably larger separation than previously used so as to accomodate the much larger "labels" being used. By movement of the spindle supplying arm 72 to a new position on the arc through which the arm swings, the only structural change required is the movement of the spindle and reduction in the arc through which the arm oscillates. Of course, once the cake 56 and the laminated pictures 46 are loaded into the record press, center pin 80 is inserted through the two laminated pictures and the cake, the vacuum is removed and the arms swung out of the dressing station in accordance with the prior art technique. Thus, the present invention may be readily adapted to practice on prior art automated record pressing equipment with only a minimum amount of structural changes required, making the present invention method economically highly desirable.

The changes hereinbefore described with respect to the automated record press did not include the repositioning of spindle 64 supplying the laminated pictures for loading by arm 61. This allows arm 61 to swing between two angular positions as opposed to three, though of course if desired, or if so constrained by space considerations, that supply could also be repositioned, with the laminated pictures being picked up at a third intermediate angular position. Obviously also for the reasons hereinbefore described, the laminated pictures in each stack preferably have the same picture orientations and the orientations between the stacks should be such that the two laminated pictures as delivered to the pressing station will have their pictures aligned.

As previously mentioned, the present invention is preferably practiced using laminated pictures having a diameter less than the diameter of the finished record and greater than the diameter of the largest sound grooves, using a boomershot or premolded cake for the center core. It is to be understood, however, that larger or smaller laminated pictures may be used, and/or in place of the boomershot, a center plastic sheet of appropriate thickness having a diameter approximately equal to or greater than the flash lands on the record press could be used. Further the laminated pictures may be formed by cutting the individual pictures prior to laminating with the clear thermoplastic, the only requirement being that the periphery of the clear plastic be at least as large as the periphery of the picture so that the entire picture is covered. (In such an instance, the clear plastic may be as large or larger than the press flash lands if desired). In that regard, the specific apparatus disclosed herein for the automated pressing of records is exemplary only, as many prior art automated record presses may be adapted to press picture records in accordance with this invention, the selection of such presses being limited only by the convenience with which they may be altered to provide the required clearance to handle the much larger laminated pictures. Using the preferred methods, however, the resulting picture record is generally in accordance with the cross-section of FIG. 14, with the surfaces 84 displaying the pictures and having the grooves thereon, being bordered by a rim region 86 formed of the central core material and fused to the edge of the clear plastic sheets.

Thus while certain preferred methods and equipment for practicing those methods have been disclosed and described herein, it will be understood by those skilled in the art that various changes in form and detail may be made therein without department from the spirit and scope of the invention.

I claim:

1. A method of making a picture record comprising the steps of:
    (a) printing a picture on a first surface of paper;
    (b) laminating said first surface with a thin clear thermoplastic sheet to form a laminated paper including a laminated picture having said picture showing through the clear thermo plastic sheet;
    (c) cutting the laminated paper including said laminated picture to a diameter less than the diameter of the flash lands on a record press and greater than the diameter of the sound grooves on a finished record, said thermoplastic sheet being cut to the same diameter as the laminated picture;
    (d) loading said laminated picture made in accordance with steps (a) through (c) into a record press having a first and second platen with at least one of said platens having sound grooves defined on the surface of said platen, with picture and clear thermoplastic sheet facing the platen having said sound grooves;
    (e) placing a quantity of thermoplastic material adjacent a second surface of the paper; and
    (f) closing the record press to mold a record and impress sound grooves into the outer surface of the clear thermoplastic sheet.

2. The method of claim 1 wherein step (e) comprises the step of placing a premolded biscuit adjacent a second surface of the paper.

3. The method of claim 1 wherein the laminated picture is automatically loaded into the record press in step (d) by an automatic loading mechanism.

4. The method of claim 1 wherein a center hole is also cut in step (c), the center hole having a diameter slightly less than the diameter of the record press spindle.

5. The method of claim 1 wherein the thermoplastic material of step (e) has a lower softening temperature than the clear thermoplastic sheet.

6. The method of claim 1 wherein step (d) comprises the additional steps of:
    (1) forming a second laminated picture according to steps (a) through (c);
    (2) loading said second laminated picture into the record press with the picture and clear thermoplastic sheet of said second laminated picture facing the other of said first and second platens.

7. The method of claim 6 wherein the two laminated pictures are loaded into the press in relative alignment whereby the pictures viewable from the two sides of the finished record will be aligned with respect to each other.

8. The method of claim 7 further comprised of the step of providing a reference indicia visually perceivable from the back of each laminated picture, the reference indicia having a fixed orientation with respect to the picture viewable from the opposite side of the laminated picture.

9. The method of claim 8 wherein the reference indicia is marked on the back of the printed paper during step (b).

10. The method of claim 8 wherein the reference indicia comprises a small notch on the periphery of the laminated picture.

11. The method of claim 1 wherein the laminated picture is manually loaded into the record press in step (d).

12. A method of making a picture record comprising the steps of:
  (a) forming a laminated picture having a picture on one surface of a paper sheet and a clear thermoplastic sheet laminated over the picture, the clear thermoplastic sheet having a periphery coterminus with that of the laminated picture, and the periphery of the laminated picture having a diameter less than the diameter of the flash lands on a record press and greater than the diameter of the sound grooves on a finished record;
  (b) loading said laminated picture made in accordance with step (a) into a record press having a first and second platen, with at least one of said platens having a surface defining sound grooves thereon, with the picture and clear thermoplastic sheet facing the platen having said sound grooves;
  (c) placing a quantity of thermoplastic material adjacent a second surface of the paper; and
  (d) closing the record press to mold a record and impress sound grooves into the outer surface of the clear thermoplastic sheet.

13. The method of claim 12 wherein the laminated picture is automatically loaded into the record press in step (b) by an automatic label loading mechanism.

14. The method of claim 12 wherein step (c) comprises the step of placing a premolded biscuit adjacent the second surface of the paper.

15. The method of claim 12 wherein the thermoplastic material of step (c) has a lower softening temperature than the clear thermoplastic sheet.

16. The method of claim 12 wherein step (b) comprises the additional steps of:
  (1) forming a second laminated picture according to step (a);
  (2) loading said second laminated picture into the record press with the picture and clear thermoplastic sheet of said second laminated picture facing the other of said first and second platens.

17. The method of claim 16 wherein the two laminated pictures are loaded into the press in relative alignment whereby the pictures viewable from the two sides of the finished record will be aligned with respect to each other.

18. The method of claim 17 further comprised of the step of providing a reference indicia visually perceivable from the back of each laminated picture, the reference indicia having a fixed orientation with respect to the picture viewable from the opposite side of the laminated picture.

19. The method of claim 18 wherein the reference indicia is marked on the back of the printed paper during step (b).

20. The method of claim 18 wherein the reference indicia comprises a small notch on the periphery of the laminated picture.

21. The method of claim 12 wherein the laminated picture is manually loaded into the record press in step (b).

22. A method of making a picture record comprising the steps of:
  (a) printing at least a first and a second picture on a first surface of paper;
  (b) laminating said first surface with a thin clear thermoplastic sheet to form a laminated paper including first and second laminated pictures having said pictures showing through the clear thermoplastic sheet;
  (c) cutting each of said first and second laminated pictures from the laminated paper so that the diameter of each of the laminated pictures is less than the diameter of the flash lands on a record press and greater than the diameter of the sound grooves on a finished record, said thermoplastic sheet being cut to the same diameter as the laminated picture;
  (d) loading a pair of said laminated pictures made in accordance with steps (a) through (c) into a record press having a first and second platen, with at least one of said platens having a surface defining sound grooves thereon, and with each picture and clear thermoplastic sheet facing a respective platen of said record press;
  (e) placing a quantity of thermoplastic material adjacent a second surface of the paper; and
  (f) closing the record press to mold a record and impress sound grooves into the outer surface of the clear thermoplastic sheet.

23. The method of claim 22 wherein the two laminated pictures are loaded into the press in relative alignment whereby the pictures viewable from the two sides of the finished record will be aligned with respect to each other.

24. The method of claim 22 wherein step (e) comprises the step of placing a premolded biscuit adjacent the second surface of the paper.

25. The method of claim 22 wherein step (a) comprises the step of printing a plurality of pictures on a first surface of paper, each picture having the same predetermined orientation with respect to the paper.

26. The method of claim 25 further comprised of providing a reference indicia visually perceivable from the back of each laminated picture, and wherein step (d) comprises the step of loading the laminated pictures each with the reference indicia having a predetermined orientation with the platens.

27. The method of claim 26 wherein the reference indicia is marked on the back of the printed paper prior to step (c).

* * * * *